US011829254B2

(12) United States Patent
Herman et al.

(10) Patent No.: US 11,829,254 B2
(45) Date of Patent: Nov. 28, 2023

(54) TECHNIQUES FOR SCALABLE DISTRIBUTED SYSTEM BACKUPS

(71) Applicant: Oracle International Corporation, Redwood Shores, CA (US)

(72) Inventors: Shmuel Herman, Kirkland, WA (US); Gabriel Thomas Hurley, Oakland, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 209 days.

(21) Appl. No.: 17/469,668

(22) Filed: Sep. 8, 2021

(65) Prior Publication Data

US 2023/0074868 A1 Mar. 9, 2023

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 2009/4557* (2013.01); *G06F 2009/45587* (2013.01); *G06F 2009/45595* (2013.01)

(58) Field of Classification Search
CPC ............. G06F 11/1464; G06F 9/45558; G06F 2009/4557; G06F 2009/45587
See application file for complete search history.

(56) References Cited

U.S. PATENT DOCUMENTS 8,335,768 B1 * 12/2012 Desai .................. G06F 11/1448
707/694
2010/0332530 A1 * 12/2010 McKelvie ............. G06F 16/278
707/769

* cited by examiner

*Primary Examiner* — Nadeem Iqbal
(74) *Attorney, Agent, or Firm* — Kilpatrick Townsend & Stockton LLP

(57) ABSTRACT

Techniques discussed herein manage backups of a service cell (SC). Each SC may include a data plane that is isolated from other SCs and comprises a distributed computing cluster (a cluster). A manifest that specifies one or more backup policies may be used to generate a full backup or a partial backup of a data set stored by the cluster. In accordance with the manifest, a signal may be sent to nodes of the cluster. In response, the nodes may transmit locally-stored data (e.g., data segments) to specified locations at a remote storage. The system may maintain a mapping of which segments correspond to data that was stored in the cluster at a time corresponding to a full or partial backup.

20 Claims, 10 Drawing Sheets

TECHNIQUES FOR SCALABLE DISTRIBUTED SYSTEM BACKUPS

BACKGROUND

Cloud-based platforms have become increasingly common. Cloud data centers are challenged to provide high performance and quality service. Such cloud-based platforms may offer entire suites of cloud solutions built for a tenant's data. Resources assigned to the tenant may reside in one or more service cells (each being an example of an isolated set of resources). Service cells provide a number of benefits such as limiting the blast radius of bugs, attacks, load spikes, and other forms of sustained emergent performance degradation. The particular data stored within the service cells may vary over time.

BRIEF SUMMARY

Techniques are provided (e.g., a method, a system, non-transitory computer-readable medium storing code or instructions executable by one or more processors) for managing backups for isolated hosting environments (e.g., cloud-computing environments referred to as "a service cells") based at least in part on user-defined backup policies. Various embodiments are described herein, including methods, systems, non-transitory computer-readable storage media storing programs, code, or instructions executable by one or more processors, and the like.

One embodiment is directed to a method for managing backups of one or more isolated hosting environments (e.g., service cells). The method may include implementing an isolated hosting environment of a cloud-computing environment. In some embodiments, the isolated hosting environment comprising a management plane and a data plane. The management plane and the data plane may be isolated from other hosting environments. The isolated hosting environment may comprise a distributed computing cluster configured to operate in the data plane. The method may further comprise obtaining, by a computing component of the data plane, a manifest that specifies one or more backup policies related to generating at least one of a full backup or a partial backup of a data set stored by the distributed computing cluster. The method may further comprise transmitting, in accordance with the one or more policies, one or more requests from the computing component to one or more respective nodes of the distributed computing cluster. In some embodiments, the one or more respective nodes may individually be configured to transmit one or more segments stored at a respective node to a remote storage location in response to a respective request. The method may further comprise obtaining, by the computing component of the data plane from a first node of the one or more nodes, a first segment identifier identifying a first segment that is stored at the first node and at the remote storage location. The method may further comprise obtaining, by the computing component of the data plane from a second node of the one or more nodes, a second segment identifier identifying a second segment that is stored at the second node and within the full backup. The method may further comprise maintaining, by the computing component, a mapping comprising an association between the first segment identifier, the second segment identifier, and an indicator indicating the association relates to a full backup. In some embodiments, the mapping enables the full backup to be reconstructed using the association between the first segment identifier and the second segment identifier.

Another embodiment is directed to a cloud-computing system comprising one or more processors and one or more non-transitory computer-readable instructions that, when executed by the one or more processors, cause the cloud-computing system to perform the disclosed methods.

Yet another embodiment is directed to a non-transitory computer-readable storage medium storing computer-executable instructions that, when executed by one or more processors of a computing device, cause the computing device to perform the disclosed methods.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which.

DETAILED DESCRIPTION

Figure 1:
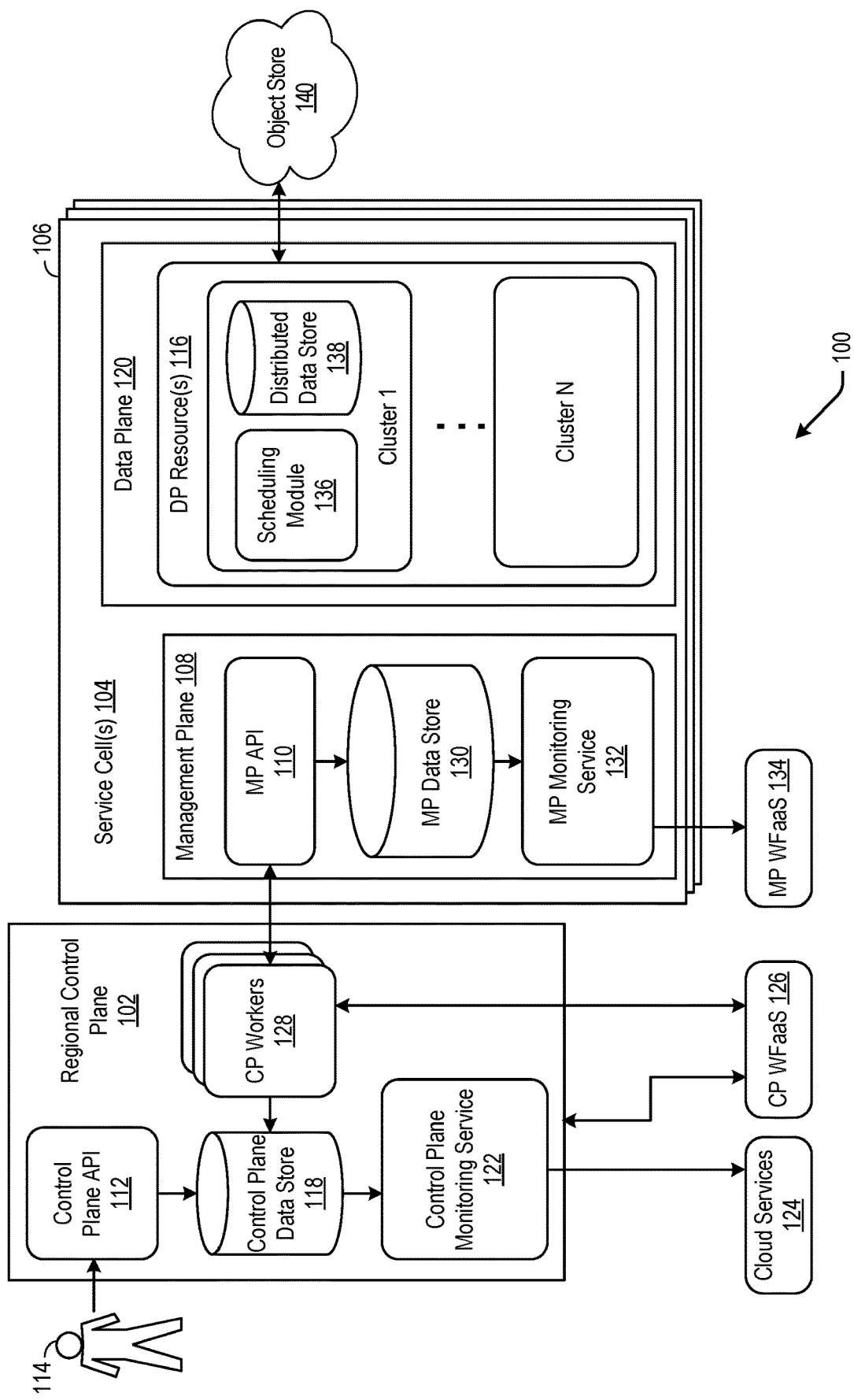
FIG. 1 illustrates an example cloud-computing environment that includes any suitable number of service cells, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for managing backups of one or more isolated hosting environments. An "isolated hosting environment," sometimes referred to herein as a "service cell," is a hosting environment that is hosted on its own infrastructure. A service cell may be isolated in that it does not share hosts or virtual machines with other service cells. A service cell may include any suitable combination of: a deployment of a management plane codebase, a set of data plane resources (e.g., a computing cluster), a monitoring service, one or more management plane data stores, one or more management plane workflow-as-a-service instances (e.g., a set of worker processes), or the like. Thus, a service cell may be a kind of logical data center (e.g., a logical grouping of performance isolation and fault isolation) within a single availability domain or region. While fault domains protect against issues when a system is being actively changed, service cells may limit the blast radius when a system experiences potentially sever issues, whether or not it is being actively changed. As the data contained in these service cells may change over time, backups of the data may be beneficial at the very least.

In some embodiments, a management plane of the service cell may be utilized to receive a manifest that identifies one or more backup policies for a data plane (DP) resource (e.g., a computing cluster, referred to as "a cluster," for brevity). The management plane may store the manifest for subsequent use. A master node of the cluster may be elected. The master node may execute a scheduling engine that may be configured to obtain the manifest and store it locally at the master node. The master node's scheduling engine may be configured to obtain full and/or partial backups of the data stored at the computing cluster in accordance with the one or more backup policies of the manifest. In accordance with the policies of the manifest, the master node may initiate a full or partial backup. During this process, the master node may send a signal to the nodes of the cluster. Each node may execute a search indexing engine (e.g., Lucene, etc.) that may be configured to identify segments of data stored locally at each. Said another way, the search indexing engine may be configured to segment the data stored at each node. Segmenting the data may include assigning a segment identifier to a portion of the data (e.g., all, a subset, etc.). If a full backup is being performed, each node may transmit their corresponding data segments to remote storage (e.g., object storage outside the service cell). The master node may then maintain a mapping of which segment (e.g., identified by segment identifiers) correspond to the full backup performed. If a partial backup is being performed, the master node may identify the segments already in remote storage, and request from each node the segments stored locally at each node. The master node can compare the segment identifiers corresponding to segments already stored in remote storage to the segment identifiers of the segments currently stored at the nodes. The master node may transmit requests to any node storing a segment corresponding to a segment identifier that was identified by the node, but not already stored at the remote storage. The node may transmit that segment to remote storage, and the master node may maintain an additional association indicating which segments in remote storage correspond to the partial backup.

The techniques discussed herein provide for an improved storage techniques for service cells that enable full and/or partial backups to be performed. By utilizing the segments discussed herein, full and/or partial backups can be reconstructed without having to perform more than one full backup. Instead of conventional techniques which utilize incremental backups which indicate changes from one backup to the next, the techniques disclosed herein enable references to a full or partial backup to be removed without affecting any other full or partial backup.

Moving on to FIG. 1, in which an example cloud-computing environment 100 that includes any suitable number of service cells is illustrated, in accordance with at least one embodiment. Cloud-computing environment 100 may include regional control plane 102 and one or more service cell(s) 104 (of which service cell 106 is an example).

In some embodiments, the regional control plane 102 owns canonical details of all customer-facing service resources. The regional control plane 102 may be responsible for receiving manifests (e.g., documents) which include one or more backup policies. A backup policy may identify particular conditions for performing a full or partial backup of the system. By way of example only, the manifest may define a periodicity and/or a schedule by which full and/or partial backups are to be performed. In some embodiments, the manifest may indicate that when a threshold amount of new data is stored in the cluster, a partial backup is to be performed. The particular rules and/or conditions of the manifest may vary depending on the context in which the manifest and computing cluster are used.

In some embodiments, the regional control plane 102 sends the manifest to the management plane 108 (e.g., via MP API 110). The regional control plane 102 may be configured to identify a service cell to which a work request relates. This may entail maintaining a mapping of an identifier (e.g., a data plane identifier (DPID)) for a data plane resource (e.g., a computing cluster) with a particular service cell in which the data plane resource resides.

In some embodiments, the regional control plane 102 may include a control plane API 112. The control plane API 112 may be utilized to receive (e.g., from user 114 via a user device (not depicted)) a manifest for performing full and/or partial backups of DP resource(s) 116. The DP resource(s) 116 may include, for example, any suitable number of computing nodes corresponding to any suitable number of computing clusters (e.g., clusters 1-N).

In some embodiments, the regional control plane 102 may include a control plane data store 118, which may be configured to store the manifest corresponding to any suitable portion of the DP resource(s) 116 (e.g., a manifest for cluster 1). In some embodiments, the control plane data store 118 may be configured to store a mapping of one or more DPIDs of DP resource(s) 116 with a service cell identifier (SCID) (e.g., a SCID of service cell 106) corresponding to a service cell of the service cell(s) 104. In some embodiments, the service cell(s) 104 may be preconfigured and the regional control plane 102 may be configured to assign a client's resources (e.g., the user 114's DP resources) to a given service cell. The control plane data store 118 may store a mapping that maintains this assignment of service cell to DP resource such that a service cell corresponding to a given DP resource (e.g., cluster 1) may be identified.

The regional control plane 102 may include a control plane monitoring service 122. The control plane monitoring service 122 may be a service that is configured to periodically determine whether a new manifest has been received. Control plane monitoring service may be communicatively coupled to cloud services 124 which may include any suitable number of cloud computing services configured to manage billing, identity, authorization, and the like. In some embodiment, control plane monitoring service 122 may be communicatively coupled to control plane (CP) workflow-as-a-service (WFaaS) 126. The control plane monitoring service 122 may utilize CP WFaaS 126 (e.g., to identify one or more instructions) to initiate one or more workers of CP worker(s) 128 to forward the manifest to a given management plane (e.g., management plane 108).

In some embodiments, a CP worker of the CP worker(s) 128 may be configured to receive the manifest and determine a particular management plane (e.g., management plane 108) to which the manifest is to be sent. In some embodiments, the CP worker may access a mapping stored in the control plane data store 118 to determine that a DPID associated with the manifest (e.g., and included in the manifest) corresponds to a particular service cell (e.g., service cell 106) of the service cell(s) 104. In some embodiments, if no DPID exists or an association to a service cell has not already been established, the CP worker may be configured to notify the user 114 via the control plane API 112 that the manifest does not apply to any known DP resource. Alternatively, if an assignment is made, the CP worker may be configured to transmit the manifest to the management plane 108 of the service cell (e.g., service cell 106) corresponding to the DP resource to which the manifest relates.

The management plane of a service cell (e.g., an example of which is management plane 108) may include a management plane (MP) application programming interface (API) (e.g., MP API 110) configured to receive manifests from CP worker(s) 128 of regional control plane 102. In some embodiments, the MP API 110 may be configured to store the manifest in MP data store 130, a storage resource configured to store such data.

The management plane 108 may include MP monitoring service 132. MP monitoring service 132 may be configured to periodically (e.g., according to a predetermined frequency, schedule, etc.) determine whether a new manifest has been received and/or if a backup is missing based at least in part on a manifest stored at the MP data store 130. The MP monitoring service 132 may be communicatively coupled to MP WFaaS 134. In some embodiments, the MP monitoring service 132 may be configured to initiate (e.g., using the MP WFaaS 134) a workflow that causes a full or partial backup of a DP resource (e.g., cluster 1) to be initiated and/or scheduled. The MP WFaaS 134 may be configured to identify the particular workflow with which such a task is to be accomplished and may initiate any suitable number of workflow processes to execute the workflow identified by the MP WFaaS 134.

In some embodiments, any suitable combination of the components of the management plane 108 described above, may be implemented by a computing cluster (e.g., a Kubernetes computing cluster) separate from the DP resource(s) 116. Likewise, each DP resource (e.g., clusters 1-N) may individually be implemented by a computing cluster (e.g., a Kubernetes computing cluster).

In some embodiments, each DP resource (e.g., cluster 1) of DP resource(s) 116 may include a scheduling module (e.g., scheduling module 136). A DP resource (e.g., cluster 1) may implement a distributed data store (e.g., distributed data store 138). Each DP resource may include any suitable number of computing nodes (not depicted), which may include any suitable number of worker nodes and/or any suitable number of master nodes. In some embodiments, a leader election algorithm may be utilized to identify a primary master node. This primary master node may be responsible for ensuring that full and/or partial backups are obtained in accordance with the manifest. In some embodiments, the computing nodes may be configured to store various portions of the data of the distributed data store 138 at object store 140. Object store 140 may be any suitable storage location remote to the service cell(s) 104. The object store 140 may be a storage location that is not included in a service cell of any kind.

In some embodiments, each node of the DP resource may execute a search indexing engine (e.g., Lucene) that may be configured to identify segments of data stored locally at a given computing node. Further examples of this segment identification is discussed in further detail with respect to FIGS. 3 and 4.

In some embodiments, the scheduling module 136 may be configured to identify one or more full and/or partial backups and store an indication of these backups within MP data store 130.

Figure 2:
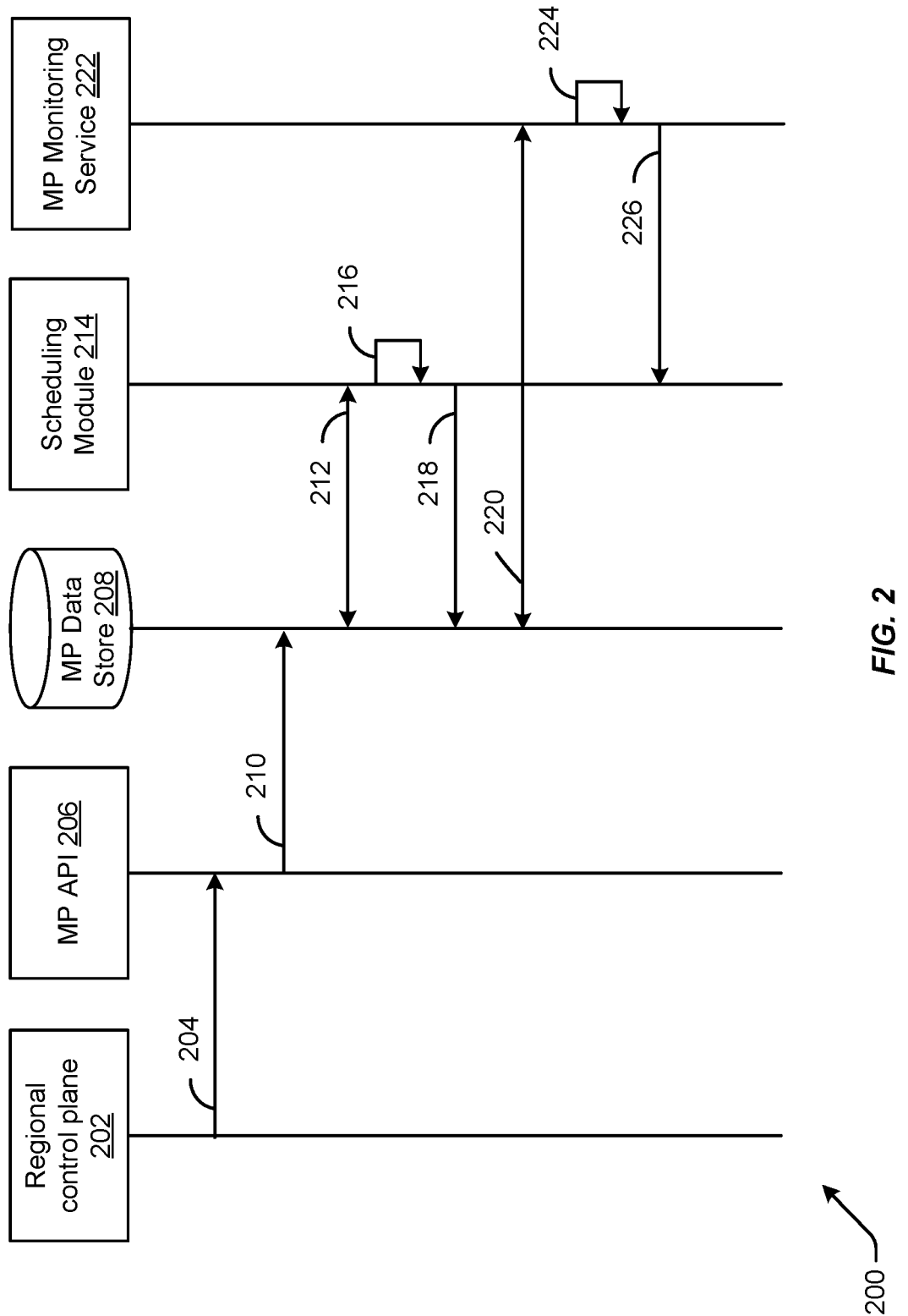
FIG. 2 illustrates an example flow for receiving a manifest and checking for missing backups, in accordance with at least one embodiment.

FIG. 2 illustrates an example flow 200 for receiving a manifest and checking for missing backups, in accordance with at least one embodiment. At any suitable time prior to the execution of flow 200, the regional control plane 202 (an example of the regional control plane 102 of FIG. 1) may receive a manifest corresponding a data plane (DP) resource of a particular service cell (e.g., cluster 1 of FIG. 1).

The flow may begin at 204, where the regional control plane 202 transmits the manifest to MP API 206, an example of the MP API 110 of FIG. 1. In some embodiments, the MP API 110 may be configured to write the manifest to the MP data store 208 at 210. The MP data store 208 may be an example of the MP data store 130 of FIG. 1.

At 212, scheduling module 214 (an example of the scheduling module 136 operating on a master node of a computing cluster such as cluster 1 of FIG. 1) may poll the MP data store 208 for the manifest. In this context, polling for the manifest may include querying the MP data store 208 for a manifest corresponding to a data plan identifier associated with the DP resource (e.g., the cluster 1) in which the scheduling module 214 executes. The scheduling module 214 may be configured to poll for the manifest at any suitable time, according to any suitable periodicity and/or schedule. In some embodiments, the particular manner by which the scheduling module 214 polls for the manifest (or manifest changes) may be predefined and/or user-configurable.

Figure 3:
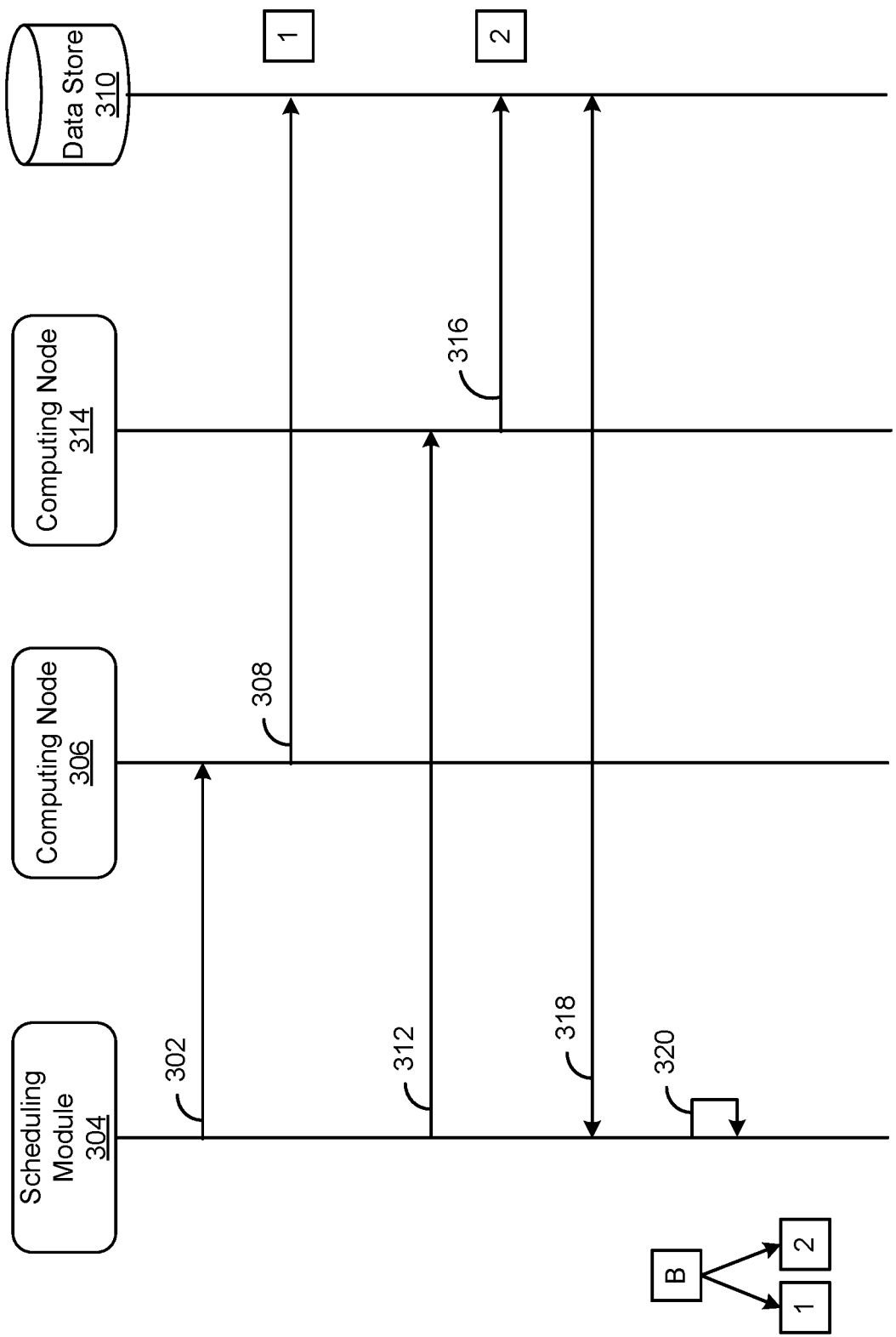
FIG. 3 illustrates an example flow for executing a full backup of a data plane resource, in accordance with at least one embodiment.
Figure 4:
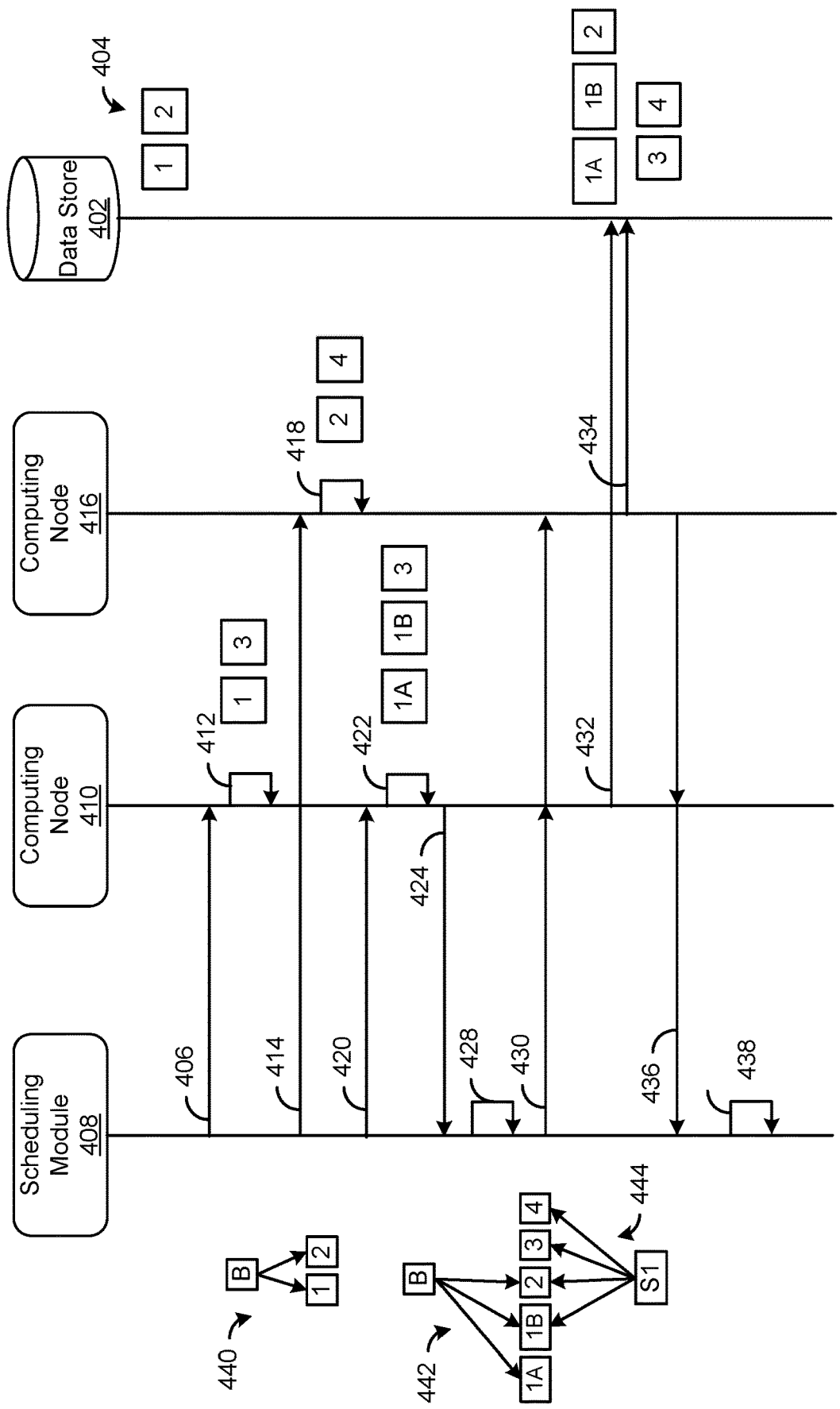
FIG. 4 illustrates an example flow for executing a partial backup of a data plane resource, in accordance with at least one embodiment.

At 216, the scheduling module 214 may proceed to execute various backups in accordance with the manifest obtained at 212. FIGS. 3 and 4 provide more detailed examples of the processes for executing these backups. At 218, the scheduling module 214 may store (e.g., in the MP data store 208) an indication of the one or more backups already performed. As a non-limiting example, the scheduling module 214 may store a mapping including any suitable number of associations. Each association may include one or more segment identifiers corresponding to a particular backup, an indication as to whether that backup was a full and/or partial backup, and any suitable metadata corresponding to the backup (e.g., such as a timestamp or other time indicator at which the backup was completed or is otherwise associated).

At 220, MP monitoring service 222 (e.g., an example of the MP monitoring service 132 of FIG. 1) may be configured to obtain the manifest and the mapping stored at MP data stored at MP data store 208. In some embodiments, the MP monitoring service 222 may obtain the mapping from the scheduling module 214 or another suitable storage location at which the mapping has been previously stored by the scheduling module 214.

At 224, the MP monitoring service 222 may identify, based at least in part by the one or more policies and/or schedule indicated in the manifest and the indication of what backups have already been performed, that a backup is missing. By way of example, the MP monitoring service 222 may identify that a backup of the DP resource is to occur every night at 9 PM. The MP monitoring service 222 may identify a backup as missing if a current time is after 9 PM and no indication exists that a backup was performed at 9

PM. For example, the MP monitoring service 222 may identify a backup as missing if the mapping fails to indicate that a backup was performed within a threshold time period of 9 PM.

At 226, the MP monitoring service 222 may transmit any suitable data to the scheduling module 214 to cause the scheduling module 214 to perform a backup. The particular backup requested by the MP monitoring service 222 may be determined by the MP monitoring service 222 based at least in part on the manifest.

FIG. 3 illustrates an example flow 300 for executing a full backup of a data plane resource (e.g., cluster 1 of FIG. 1), in accordance with at least one embodiment.

The flow 300 may begin at 302, wherein the scheduling module 304 (executing on a master node of cluster 1) may send a request or other suitable signal to the computing node 304 (e.g., a computing node of cluster 1). The computing node 304 may be configured to execute a search indexing engine (e.g., Lucene) that is configured to identify one or more segments corresponding to data locally stored at the computing node 304.

At 308, in response to receiving the request or signal at 302, the computing node 306 may transmit the data locally stored at the computing node 306 to the data store 310 (e.g., an example of the object store 140 of FIG. 1). By way of example, the data locally-stored at computing node 306 may have been assigned (e.g., by the search indexing engine operating at computing node 306) a segment identifier of "1." Thus, the data and the segment identifier corresponding to the data may be transmitted and stored at the data store 310.

At 312, the scheduling module 304 may send another request or other suitable signal to the computing node 314 (e.g., a different computing node of cluster 1). The computing node 314 may also be configured to execute a search indexing engine (e.g., Lucene) that is configured to identify one or more segments corresponding to data locally stored at the computing node 314.

At 316, in response to receiving the request or signal at 312, the computing node 314 may transmit the data locally stored at the computing node 314 to the data store 310. By way of example, the data locally-stored at computing node 314 may have been assigned (e.g., by the search indexing engine operating at computing node 314) a segment identifier of "2." In some embodiments, the data and the segment identifier corresponding to the data may be transmitted and stored at the data store 310.

Any suitable number of requests/signals may be transmitted by the scheduling module 304 to any suitable number of computing nodes (e.g., to each of the computing nodes of the cluster 1) in order to cause a copy of the full data set stored within the cluster to be stored at the data store 310. The full data set may be stored as segments with corresponding segment identifiers within data store 310.

At 318, the scheduling module 304 may identify the set of segment identifiers from the data store 310. In some embodiments, the scheduling module 304 may obtain pointers to the various storage locations at which the set of segments are located within the data store 310.

At 320, the scheduling module 304 may generate data corresponding to the backup. The data generated may include indicators of the one or more segments included in the backup. In some embodiments, the scheduling module 304 may include the pointers corresponding to the locations at which the segments are stored in data store 310. The data generated by the scheduling module 304 may include any suitable metadata such as an identifier for the backup, an indicator that indicates the backup is a full backup or a partial backup, one or more timestamps at which the backup was initiated and/or completed, or any suitable metadata corresponding to the backup. The scheduling module 304 may store this mapping locally and/or the scheduling module 304 may transmit the mapping to the MP data store 130 of FIG. 1 for storage.

FIG. 4 illustrates an example flow 400 for executing a partial backup of a data plane resource (e.g., cluster 1 of FIG. 1), in accordance with at least one embodiment. Continuing on with the example provided in FIG. 3, the data store 402 (e.g., an example of the data store 310 of FIG. 3) may store data from the cluster in segments with corresponding segment identifiers. For example, after the flow 300 of FIG. 3 is performed, the data store 402 stored two segments corresponding to segments "1" and "2" as indicated at 404.

At 406, the scheduling module 408 (an example of the scheduling module 304 of FIG. 3) may receive a write operation that causes additional data to be transmitted to computing node 410 (an example of the computing node 306 of FIG. 3). Computing node 410 may be configured to operate a search indexing engine (e.g., Lucene) that is configured to assign the data received by the computing node 410 a segment identifier. At 412, the computing node 410 may associate a segment identifier (e.g., the segment identifier "3") with the data received at 406.

At 414, the scheduling module 408 may receive a write operation that causes additional data to be transmitted to computing node 416 (an example of the computing node 314 of FIG. 3). Computing node 416 too may be configured to operate a search indexing engine (e.g., Lucene) that is configured to assign the data received by the computing node 416 a segment identifier. At 418, the computing node 416 may associate a segment identifier (e.g., the segment identifier "4") with the data received at 414.

At 420, the scheduling module 408 may receive a delete operation that causes some portion of the data stored at computing node 410 to be deleted. By way of example, the deletion operation may indicate that some portion of the data previously associated with segment identifier 1 is to be deleted.

At 422, the computing node 410 (e.g., the search indexing engine of the computing node 410) may be configured to split segment 1 into two segment, segments 1A and 1B, where 1A includes the data to be deleted and 1B includes the remaining data of segment 1, excluding the data of segment 1A. At 424, the computing node 410 may transmit data to the scheduling module 408 to update a mapping. By way of example, a mapping maintained by the scheduling module 408 may initially indicate that a full backup "B" included segments 1 and 2. An association between an identifier of the backup (e.g., "B"), one or more segment identifiers and/or one or more pointers to locations of the segments included in the backup, and an indication (e.g., an identifier that starts with a "B", a value associated with a full or partial backup, etc.) that indicates the backup is a full backup or a partial backup (e.g., a snapshot) may be stored. The graphical element at 426 depicts this initial association.

At 428, the scheduling module 408 may determine that the manifest indicates a partial backup (also referred to as a "snapshot") is to be performed.

At 430, the scheduling module 408 may send requests and/or signals to the computing nodes 410 and 416, the receipt of which may cause the computing nodes 410 and 416 to update the segments stored at data store 402. By way of example, At 432, the computing nodes 410 may transmit the data corresponding to segments 1A, 1B, and 3 to the data store 402. Segments 1A and 1B may be stored in a manner that replaces segment 1 that was previously stored at the data store 402. The segments 1A and 1B may be transmitted at 432 due to the fact that these segments represent a modified version of a segment that was previously stored at the data store 402. Segment 3 may be transmitted due to the fact that it has not been previously store at the data store 402. Similarly, computing node 416 may transmit the segment 4 to the data store 402 at 434 due to the fact that segment 4 had not been previously stored at the data store 402. In some embodiments, each of the segments 1A and 1B stored at the data store 402 may be associated with an indication that they, at least in part, replace data previously associated with segment 1.

At 436, the scheduling module 408 may receive information from the computing nodes 410 and 416 indicating what segments are currently stored at the respective nodes. In some embodiments, the computing node 410 may not inform the scheduling module 408 of the replacement of segment 1 with segments 1A and 1B at 424, rather, the computing node 408 may wait until the request/signal is received at 430 before transmitting this information to the scheduling module 408 at 436. In fact, any suitable update (e.g., the addition of segment 3 to computing node 410, the additional of segment 4 to computing node 416, the replacement of segment 1 with segments 1A and 1B, etc.) may be provided to the scheduling module 408 by the computing nodes 410 and 416 at 436.

At 436, the scheduling module 408 may be configured to update one or more associations within a mapping it maintains. By way example, the scheduling module 408 may update and/or generate one or more associations based at least in part on receiving an indication from computing node 410 that it now stores segments 1A and 1B (previously corresponding to segment 1) and segment 3. The scheduling module 408 may be configured to update the association depicted at 440 with the one depicted at 442. By way of example, the pointer that once referenced segment 1 and was associated with the full backup performed by flow 300 of FIG. 3, may be updated to include two pointers, one pointer that references a location of segment 1A and another that references the location of segment 1B. Additionally, the scheduling module 408 may generate an association depicted at 444 that indicates a snapshot was taken (e.g., snapshot "S1"), and included the segments 1B, 2, 3, and 4. Any suitable metadata may be stored as part of these associations such as an identifier of the backup (e.g., "B," S1"), a timestamp at with the backup was initiated and/or completed, and an indication that the backup is a full or partial backup.

Figure 5:
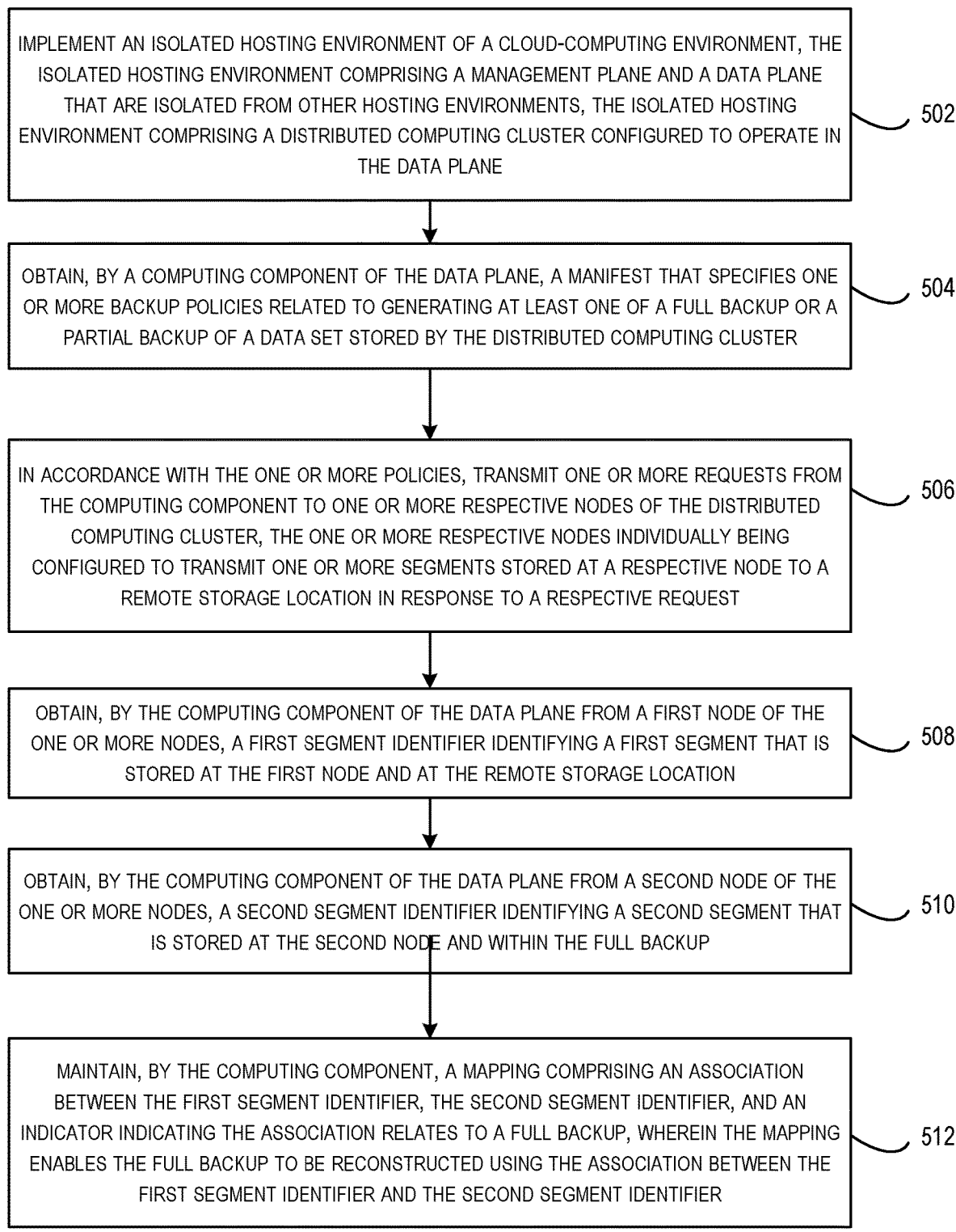
FIG. 5 is a block diagram illustrating an example method for managing one or more backups of an isolated hosting environment, in accordance with at least one embodiment.

FIG. 5 is a block diagram illustrating an example method 500 for managing one or more backups of a resource (e.g., a data plane resource such as cluster 1 of FIG. 1) of an isolated hosting environment (e.g., a service cell such as the service cell 106 of FIG. 1), in accordance with at least one embodiment. In some embodiments, the method 500 may be performed by a scheduling module (e.g., scheduling module 136 of FIG. 1) associated with the resource.

The method 500 may begin at 502, where an isolated hosting environment (e.g., a service cell) of a cloud-computing environment is implemented (e.g., by the cloud-computing environment 100 of FIG. 1). In some embodiments, the isolated hosting environment comprises a management plane (e.g., the management plane 108 of FIG. 1) and a data plane (e.g., the data plane 120 of FIG. 1) that are isolated from other hosting environments (e.g., other service cells of the service cell(s) 104 that are different from the service cell 106). In some embodiments, the isolated hosting environment comprises a distributed computing cluster (e.g., cluster 1 of FIG. 1) configured to operate in the data plane.

At 504, a manifest may be obtained by a computing component of the data plane (e.g., the scheduling module 304 of FIG. 3, an example of the scheduling module 136 of FIG. 1). In some embodiments, the manifest specifies one or more backup policies related to generating at least one of a full backup or a partial backup of a data set stored by the distributed computing cluster.

At 506, one or more requests may be transmitted in accordance with the one or more backup policies from the computing component (e.g., the scheduling module 304) to one or more respective nodes of the distributed computing cluster (e.g., computing nodes 306 and 314, examples of the nodes of cluster 1 of FIG. 1). For example, the scheduling module 304 may transmit these request to the computing nodes as described at 302 and 312 of FIG. 3, respectively. As described at 308 and 316 of FIG. 3, the one or more respective nodes may individually be configured to transmit one or more segments stored at a respective node to a remote storage location (e.g., data store 310 of FIG. 3, an example of the object store 140 of FIG. 1) in response to a respective request.

At 508, a first segment identifier identifying a first segment (e.g., segment "1") that is stored at the first node (e.g., computing node 306) and at the remote storage location (e.g., data store 310) may be obtained. By way of example, the computing component of the data plane may obtain the first segment identifier (e.g., segment "1") identifying the first segment from a first node (e.g., the computing node 306) of the one or more nodes.

At 510, a second segment identifier identifying a second segment (e.g., segment "2") that is stored at the second node (e.g., computing node 314) and at the remote storage location (e.g., data store 310) may be obtained. By way of example, the computing component of the data plane may obtain the first segment identifier (e.g., segment "1") identifying the first segment from a first node (e.g., the computing node 306) of the one or more nodes.

At 512, a mapping comprising an association between the first segment identifier, the second segment identifier, and an indicator indicating the association relates to a full backup may be maintained (e.g., by the scheduling module 304). In some embodiments, the mapping may be maintained at the scheduling module 304 (e.g., in local memory at a master node of cluster 1) or within the management plane 108 (e.g., at the MP data store 130 of FIG. 1). In some embodiments, the mapping enables the full backup to be reconstructed using the association between the first segment identifier and the second segment identifier. By way of example, the full backup may be reconstructed using pointers obtained from the mapping that identify a location at which respective segments of the data set are stored at the object store 140. These pointers may be used to retrieve the data stored at those locations to reconstruct the full backup.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
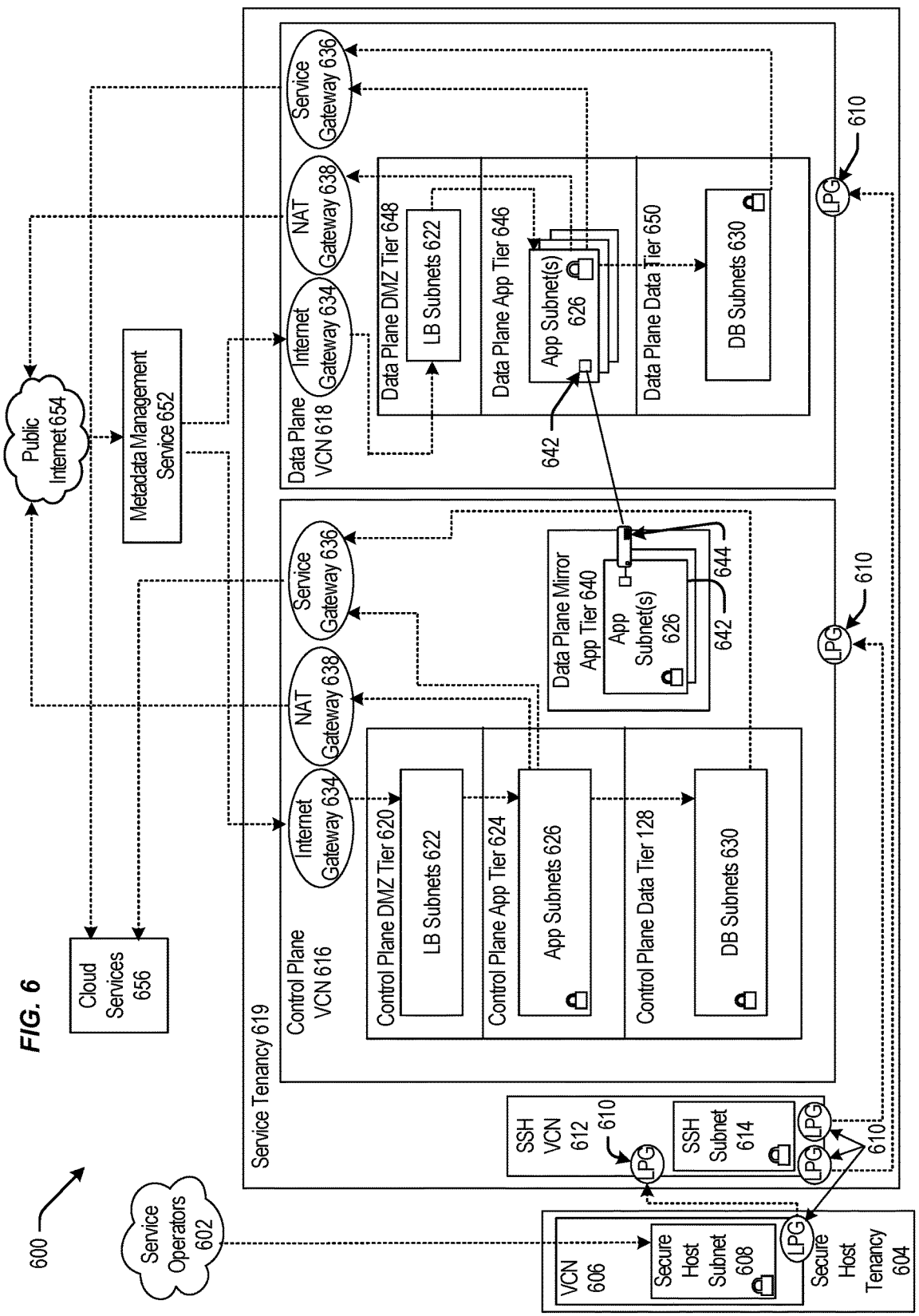
FIG. 6 is a block diagram illustrating a pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
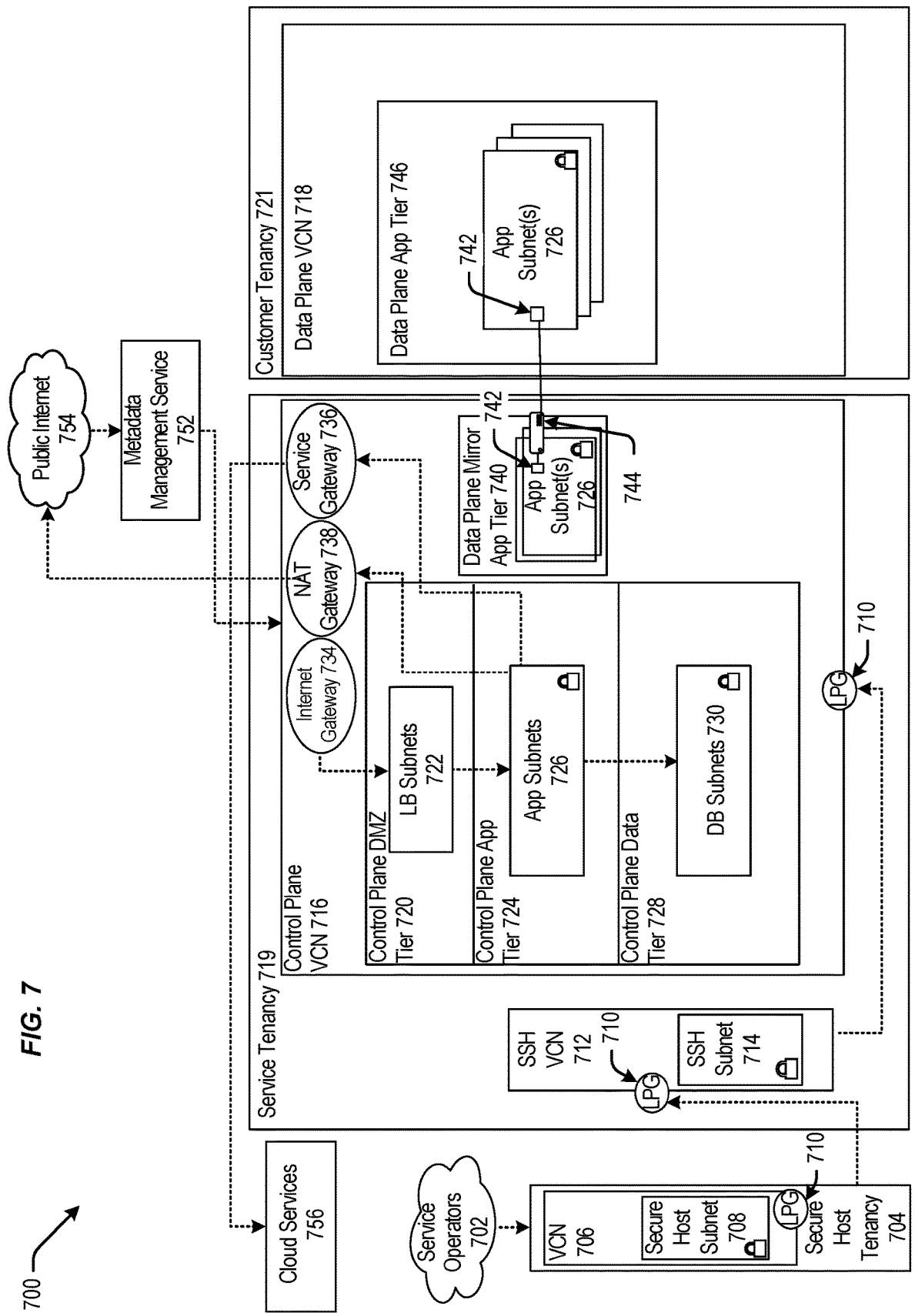
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
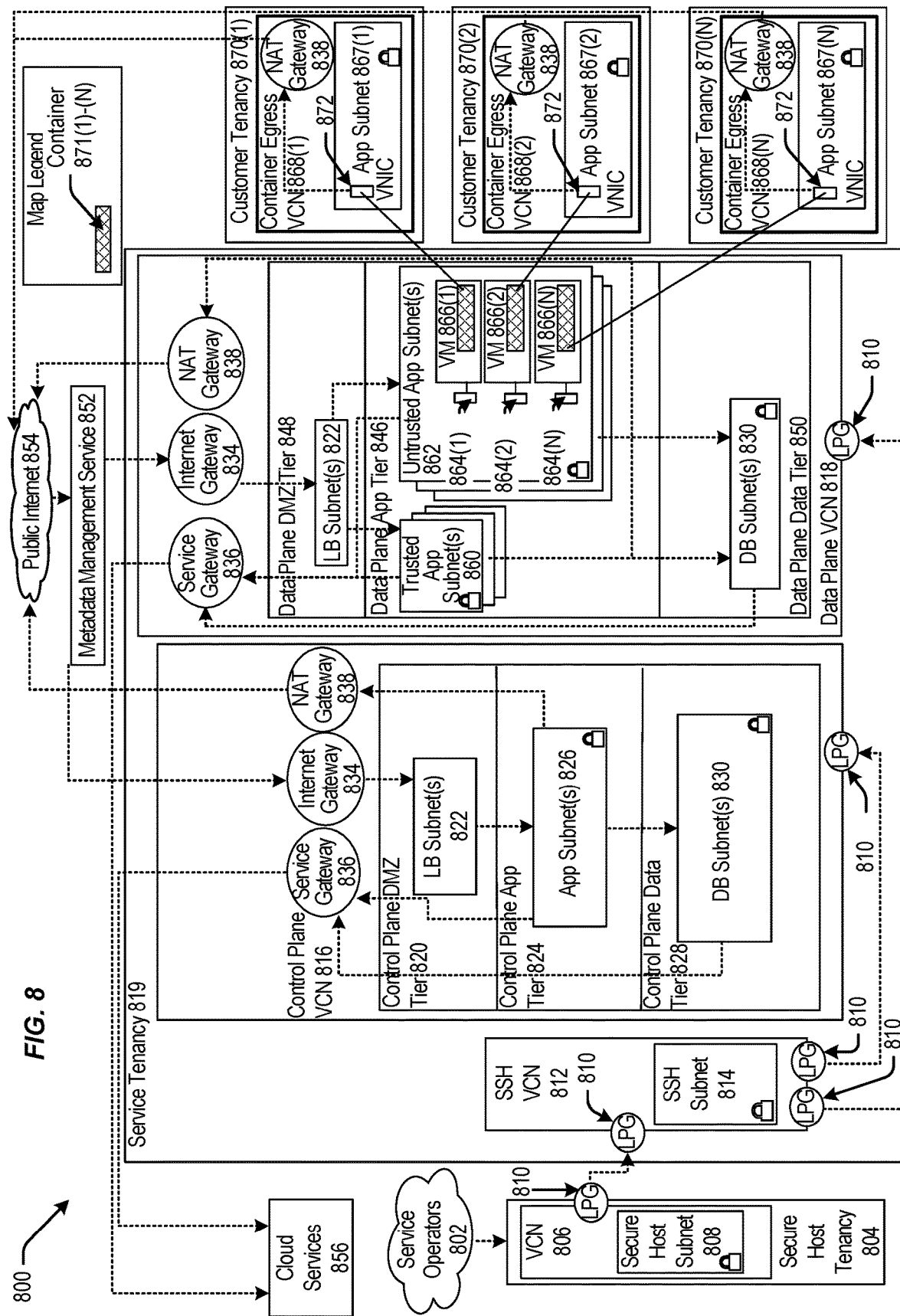
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
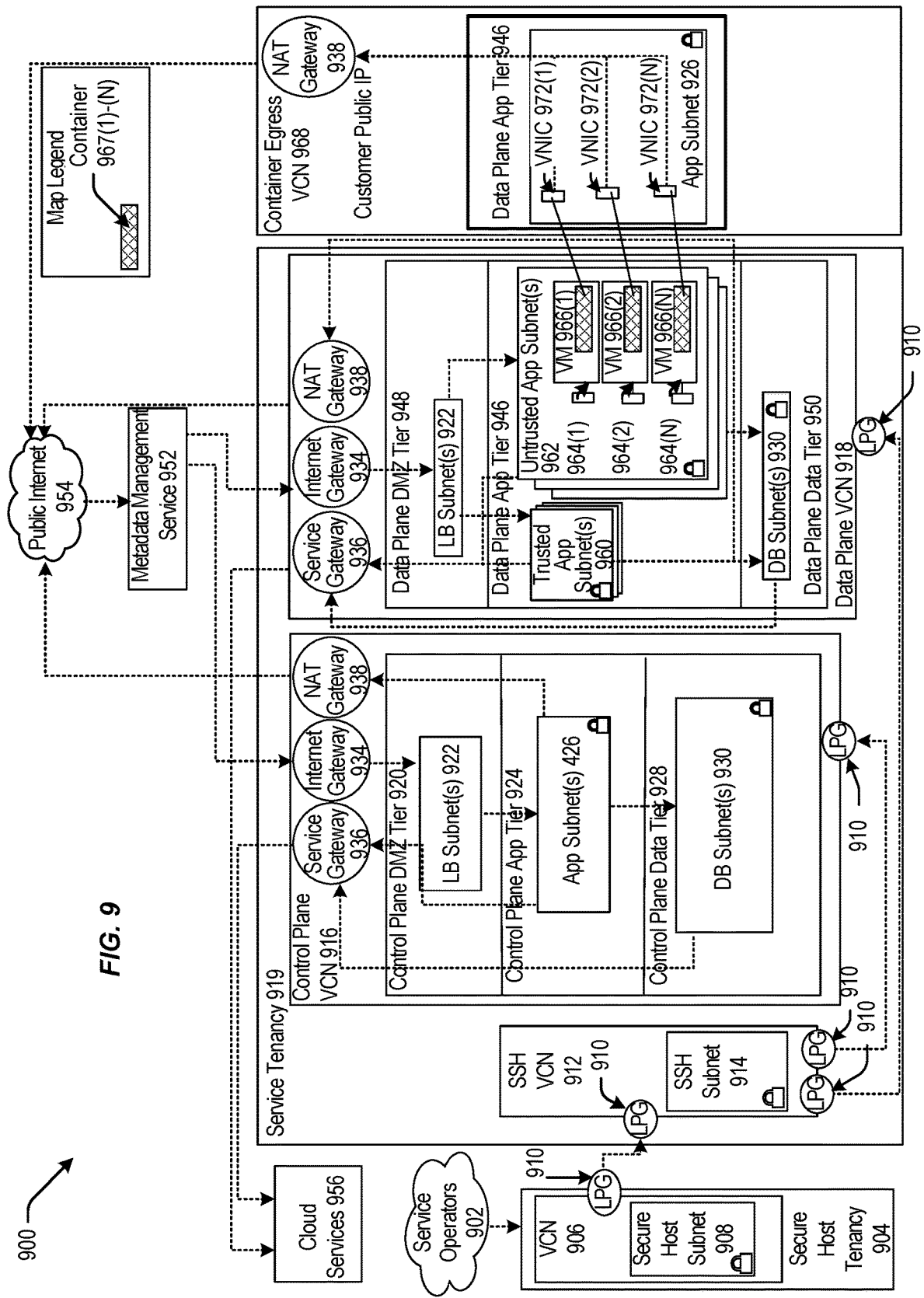
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
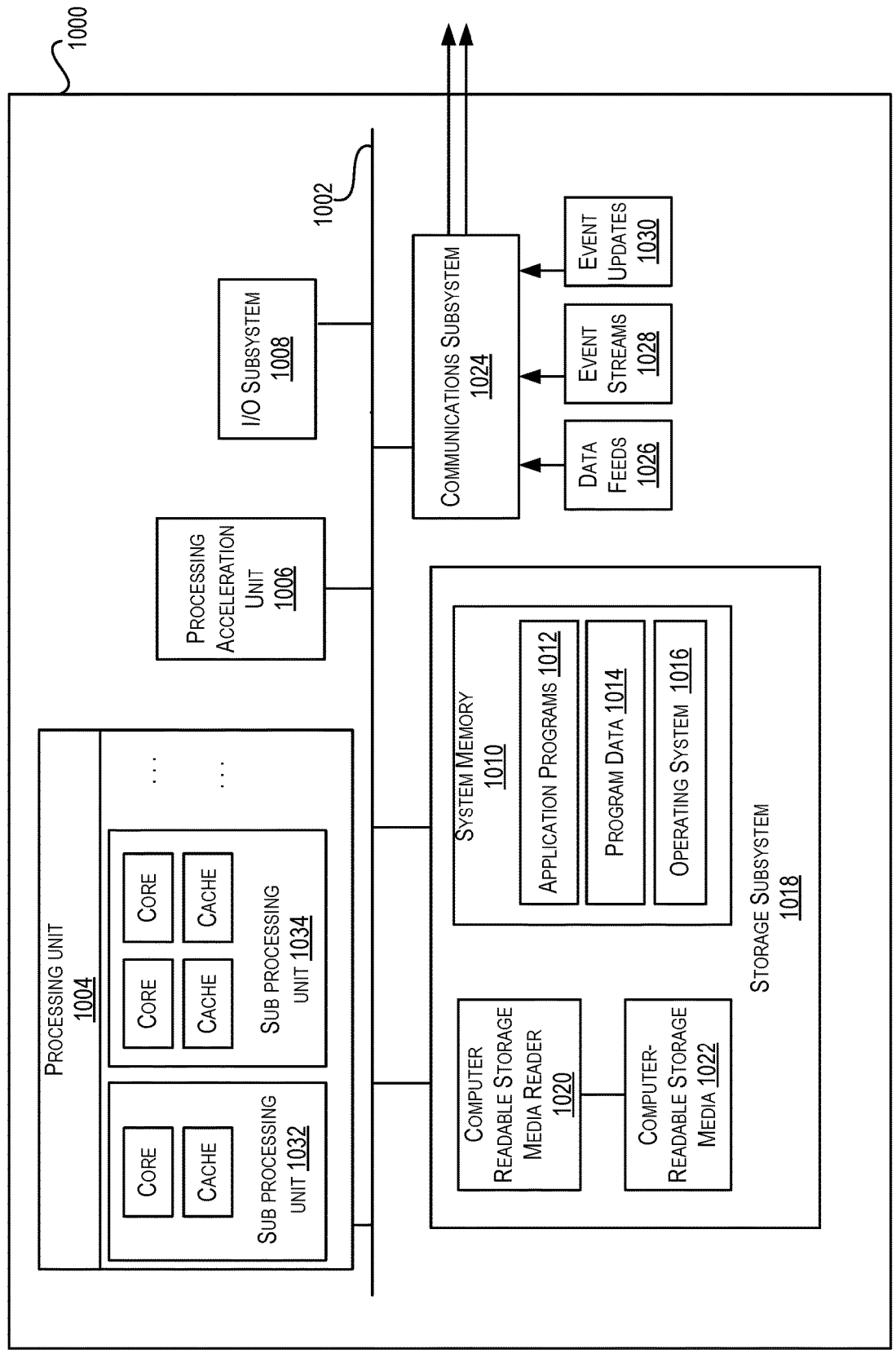
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    implementing an isolated hosting environment of a cloud-computing environment, the isolated hosting environment comprising a management plane and a data plane that are isolated from other hosting environments, the isolated hosting environment comprising a distributed computing cluster configured to operate in the data plane;
    obtaining, by a computing component of the data plane, a manifest that specifies one or more backup policies related to generating at least one of a full backup or a partial backup of a data set stored by the distributed computing cluster;
    in accordance with the one or more policies, transmitting one or more requests from the computing component to one or more respective nodes of the distributed computing cluster, the one or more respective nodes individually being configured to transmit one or more segments stored at a respective node to a remote storage location in response to a respective request;
    obtaining, by the computing component of the data plane from a first node of the one or more nodes, a first segment identifier identifying a first segment that is stored at the first node and at the remote storage location;
    obtaining, by the computing component of the data plane from a second node of the one or more nodes, a second segment identifier identifying a second segment that is stored at the second node and within the full backup; and
    maintaining, by the computing component, a mapping comprising an association between the first segment identifier, the second segment identifier, and an indicator indicating the association relates to the full backup, wherein the mapping enables the full backup to be reconstructed using the association between the first segment identifier and the second segment identifier.

2. The computer-implemented method of claim 1, further comprising:
   initiating the partial backup of the data set based at least in part on the manifest;
   identifying a set of segments already stored at the remote storage location;
   obtaining, by the computing component from the first node, a plurality of segment identifiers identifying a plurality of segments of the data set that are stored at the first node;
   determining, by the computing component, a subset of segments from the plurality of segments, the subset of segments excluding the set of segments already stored at the remote storage location, the subset of segments comprising changes in particular data stored at the first node after the first backup request;
   transmitting, to the first node, a second backup request requesting storage of the subset of segments at the remote storage location, the first node being configured to store the subset of segments at the remote storage location in response to the second backup request; and
   maintaining, by the computing component, an additional mapping to map at least one or more segment identifiers corresponding to the subset of segments to another indicator that indicates the additional mapping relates to the partial backup of the data set.

3. The computer-implemented method of claim 1, wherein the computing component obtains the manifest from the management plane based at least in part on requesting the manifest from the management plane.

4. The computer-implemented method of claim 1, wherein the remote storage location is remote with respect to the isolated hosting environment.

5. The computer-implemented method of claim 1, further comprising:
   transmitting, to the management plane, feedback data indicating that the full backup was completed; and
   receiving, from the management plane, a subsequent request for either another full backup or another partial backup, the management plane being configured to determine, based at least in part on the manifest set and historical feedback data, that a backup has been missed.

6. The computer-implemented method of claim 1, wherein the one or more nodes execute a search indexing engine configured to identify segments of data stored at a given node.

7. The computer-implemented method of claim 1, wherein the remote storage location comprises a super set of the data locally stored at each of the nodes of the distribute computing cluster.

8. A cloud-computing system, comprising:
   one or more processors; and
   one or more memories storing computer-executable instructions that, when executed with the one or more processors, cause the cloud-computing system to:
      implement an isolated hosting environment of a cloud-computing environment, the isolated hosting environment comprising a management plane and a data plane that are isolated from other hosting environments, the isolated hosting environment comprising a distributed computing cluster configured to operate in the data plane;
      obtain, by a computing component of the data plane, a manifest that specifies one or more backup policies related to generating at least one of a full backup or a partial backup of a data set stored by the distributed computing cluster;
      in accordance with the one or more policies, transmit one or more requests from the computing component to one or more respective nodes of the distributed computing cluster, the one or more respective nodes individually being configured to transmit one or more segments stored at a respective node to a remote storage location in response to a respective request;
      obtain, by the computing component of the data plane from a first node of the one or more nodes, a first segment identifier identifying a first segment that is stored at the first node and at the remote storage location;
      obtain, by the computing component of the data plane from a second node of the one or more nodes, a second segment identifier identifying a second segment that is stored at the second node and within the full backup; and
      maintain, by the computing component, a mapping comprising an association between the first segment identifier, the second segment identifier, and an indicator indicating the association relates to the full backup, wherein the mapping enables the full backup to be reconstructed using the association between the first segment identifier and the second segment identifier.

9. The computing system of claim 8, wherein executing the instructions further causes the computing system to:
   initiate the partial backup of the data set based at least in part on the manifest;
   identify a set of segments already stored at the remote storage location;
   obtain, by the computing component from the first node, a plurality of segment identifiers identifying a plurality of segments of the data set that are stored at the first node;
   identify, by the computing component, a subset of segments from the plurality of segments, the subset of segments excluding the set of segments already stored at the remote storage location, the subset of segments comprising changes in particular data stored at the first node after the first backup request;
   transmit, to the first node, a second backup request requesting storage of the subset of segments at the remote storage location, the first node being configured to store the subset of segments at the remote storage location in response to the second backup request; and
   maintain, by the computing component, an additional mapping to map at least one or more segment identifiers corresponding to the subset of segments to another indicator that indicates the additional mapping relates to the partial backup of the data set.

10. The computing system of claim 8, wherein the computing component obtains the manifest from the management plane based at least in part on requesting the manifest from the management plane.

11. The computing system of claim 8, wherein the remote storage location is remote with respect to the isolated hosting environment.

12. The computing system of claim 8, wherein executing the instructions further causes the computing system to:
   transmit, to the management plane, feedback data indicating that the full backup was completed; and receive, from the management plane, a subsequent request for either another full backup or the partial backup, the management plane being configured to determine, based at least in part on the manifest set and historical feedback data, that a backup has been missed.

13. The computing system of claim 8, wherein the one or more nodes execute a search indexing engine configured to identify segments of data stored at a given node.

14. The computing system of claim 8, wherein the remote storage location comprises a super set of the data locally stored at each of the nodes of the distribute computing cluster.

15. A non-transitory computer-readable storage medium comprising executable instructions that, when executed with one or more processors of a cloud-computing system, cause the cloud-computing system to:
  implement an isolated hosting environment of a cloud-computing environment, the isolated hosting environment comprising a management plane and a data plane that are isolated from other hosting environments, the isolated hosting environment comprising a distributed computing cluster configured to operate in the data plane;
  obtain, by a computing component of the data plane, a manifest that specifies one or more backup policies related to generating at least one of a full backup or a partial backup of a data set stored by the distributed computing cluster;
  in accordance with the one or more policies, transmit one or more requests from the computing component to one or more respective nodes of the distributed computing cluster, the one or more respective nodes individually being configured to transmit one or more segments stored at a respective node to a remote storage location in response to a respective request;
  obtain, by the computing component of the data plane from a first node of the one or more nodes, a first segment identifier identifying a first segment that is stored at the first node and at the remote storage location;
  obtain, by the computing component of the data plane from a second node of the one or more nodes, a second segment identifier identifying a second segment that is stored at the second node and within the full backup; and
  maintain, by the computing component, a mapping comprising an association between the first segment identifier, the second segment identifier, and an indicator indicating the association relates to the full backup, wherein the mapping enables the full backup to be reconstructed using the association between the first segment identifier and the second segment identifier.

16. The non-transitory computer-readable storage medium of claim 15, wherein executing the instructions further causes the computing system to:
  initiate the partial backup of the data set based at least in part on the manifest;
  identify a set of segments already stored at the remote storage location;
  obtain, by the computing component from the first node, a plurality of segment identifiers identifying a plurality of segments of the data set that are stored at the first node;
  identify, by the computing component, a subset of segments from the plurality of segments, the subset of segments excluding the set of segments already stored at the remote storage location, the subset of segments comprising changes in particular data stored at the first node after the first backup request;
  transmit, to the first node, a second backup request requesting storage of the subset of segments at the remote storage location, the first node being configured to store the subset of segments at the remote storage location in response to the second backup request;
  and maintain, by the computing component, an additional mapping to map at least one or more segment identifiers corresponding to the subset of segments to another indicator that indicates the additional mapping relates to the partial backup of the data set.

17. The non-transitory computer-readable storage medium of claim 15, wherein the remote storage location is remote with respect to the isolated hosting environment.

18. The non-transitory computer-readable storage medium of claim 15, wherein executing the instructions further causes the computing system to:
  transmit, to the management plane, feedback data indicating that the full backup was completed; and
  receive, from the management plane, a subsequent request for either another full backup or the partial backup, the management plane being configured to determine, based at least in part on the manifest set and historical feedback data, that a backup has been missed.

19. The non-transitory computer-readable storage medium of claim 15, wherein the one or more nodes execute a search indexing engine configured to identify segments of data stored at a given node.

20. The non-transitory computer-readable storage medium of claim 15, wherein the remote storage location comprises a super set of the data locally stored at each of the nodes of the distribute computing cluster.

* * * * *

UNITED STATES PATENT AND TRADEMARK OFFICE
CERTIFICATE OF CORRECTION

| | | |
|---|---|---|
| PATENT NO. | : 11,829,254 B2 | Page 1 of 1 |
| APPLICATION NO. | : 17/469668 | |
| DATED | : November 28, 2023 | |
| INVENTOR(S) | : Herman et al. | |

It is certified that error appears in the above-identified patent and that said Letters Patent is hereby corrected as shown below:

In the Drawings

On sheet 8 of 10, in FIG. 8, under Reference Numeral 871(1)-(N), Line 1, delete "Map Legend" and insert -- Map Legend --, therefor.

On sheet 9 of 10, in FIG. 9, under Reference Numeral 967 (1)-(N), Line 1, delete "Map Legend" and insert -- Map Legend --, therefor.

On sheet 10 of 10, in FIG. 10, under Reference Numeral 1020, Lines 1-2, delete "COMPUTER READABLE" and insert -- COMPUTER-READABLE --, therefor.

In the Specification

In Column 9, Line 49, delete "S1")," and insert -- "S1"), --, therefor.

In Column 23, Lines 35-36, delete "computer readable" and insert -- computer-readable --, therefor.

In the Claims

In Column 27, Line 19, in Claim 2, after "first" insert -- full --, therefor.

In Column 28, Line 46, in Claim 9, after "first" insert -- full --, therefor.

In Column 30, Line 19, in Claim 16, after "first" insert -- full --, therefor.

Signed and Sealed this
Twelfth Day of November, 2024

*Katherine Kelly Vidal*

Katherine Kelly Vidal
*Director of the United States Patent and Trademark Office*